US012000306B2

(12) United States Patent
McCaffrey

(10) Patent No.: US 12,000,306 B2
(45) Date of Patent: Jun. 4, 2024

(54) VANE ARC SEGMENT WITH SINGLE-SIDED PLATFORMS

(71) Applicant: RAYTHEON TECHNOLOGIES CORPORATION, Farmington, CT (US)

(72) Inventor: Michael G. McCaffrey, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/831,933

(22) Filed: Jun. 3, 2022

(65) Prior Publication Data

US 2023/0392506 A1 Dec. 7, 2023

(51) Int. Cl.
*F01D 5/28* (2006.01)
*F01D 5/14* (2006.01)
*F01D 9/04* (2006.01)
*F04D 9/04* (2006.01)

(52) U.S. Cl.
CPC ............ *F01D 5/282* (2013.01); *F01D 5/141* (2013.01); *F01D 5/147* (2013.01); *F04D 9/041* (2013.01); *F05D 2240/12* (2013.01); *F05D 2240/80* (2013.01); *F05D 2300/6033* (2013.01)

(58) Field of Classification Search
CPC .......... F01D 5/282; F01D 5/141; F01D 5/147; F01D 9/041; F05D 2240/12; F05D 2240/80; F05D 2300/6033
See application file for complete search history.

(56) References Cited

U.S. PATENT DOCUMENTS 5,131,808 A * 7/1992 Ciais ........................ F01D 5/282 415/141
8,734,925 B2 5/2014 Kweder et al.
10,415,399 B2 9/2019 Ducharme et al.
10,443,625 B2 10/2019 Langenbrunner et al.
10,815,801 B2 * 10/2020 Watanabe ............... F01D 9/041
11,448,075 B2 * 9/2022 White, III ............... F01D 5/284
(Continued)

FOREIGN PATENT DOCUMENTS

CA 2744895 A1 * 6/2010 ............. B29B 11/16
CA 2799707 A1 * 1/2012 ............. B29B 11/16
(Continued)

OTHER PUBLICATIONS

I.W. Donald Review Ceramic-matrix composites, Journal of Materials Science 11 (1976) p. 949-972 (Year: 1976).*
(Continued)

*Primary Examiner* — Brian Christopher Delrue
(74) *Attorney, Agent, or Firm* — Carlson, Gaskey & Olds, P.C.

(57) ABSTRACT

A vane arc segment includes ceramic matrix composite (CMC) fairing that has an airfoil section, a first single-sided platform at the outer radial end projecting from the suction side wall, and a second single-sided platform at the inner radial end projecting from the pressure side wall. The first single-sided platform is comprised of a fiber layer that extends from the airfoil section and turns into the first single-sided platform, and the second single-sided platform is comprised of the fiber layer that from the airfoil section and turns into the second single-sided platform.

19 Claims, 3 Drawing Sheets

(56) References Cited

U.S. PATENT DOCUMENTS

| | | | | |
|---|---|---|---|---|
| 2003/0185673 | A1 | 10/2003 | Matsumoto et al. | |
| 2005/0076504 | A1 * | 4/2005 | A. Morrison | F01D 9/044<br>29/889.7 |
| 2012/0301312 | A1 * | 11/2012 | Berczik | F01D 5/284<br>29/889.21 |
| 2014/0010662 | A1 * | 1/2014 | Duelm | F01D 5/28<br>29/889.6 |
| 2016/0230568 | A1 * | 8/2016 | Sippel | B32B 18/00 |
| 2018/0080478 | A1 | 3/2018 | Langenbrunner et al. | |
| 2019/0120071 | A1 | 4/2019 | Zaccardi et al. | |

FOREIGN PATENT DOCUMENTS

| | | | | |
|---|---|---|---|---|
| CA | 2835538 C | * | 8/2019 | B29B 11/16 |
| DE | 759514 | | 4/1953 | |
| FR | 1121516 | | 8/1956 | |

OTHER PUBLICATIONS

European Search Report for European Patent Application No. 23177223.7 mailed Jul. 21, 2023.

* cited by examiner

VANE ARC SEGMENT WITH SINGLE-SIDED PLATFORMS

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane arc segment according to an example of the present disclosure includes ceramic matrix composite (CMC) fairing that has an airfoil section that defines suction and pressure side walls, leading and trailing ends, and inner and outer radial ends. A first single-sided platform at the outer radial end projects in a first circumferential direction from the suction side wall. A second single-sided platform at the inner radial end projects in a second, opposite circumferential direction from the pressure side wall. The first single-sided platform is comprised of a fiber layer that extends from the airfoil section at the first radial end and turning into the first single-sided platform. The second single-sided platform is comprised of the fiber layer that extends from the airfoil section at the second radial end and turning into the second single-sided platform.

In a further embodiment of any of the foregoing embodiments, the first single-sided platform includes an edge portion that has a suction side contour that is complementary in shape to the suction side wall of the airfoil section.

In a further embodiment of any of the foregoing embodiments, aft of the edge portion, the first single-sided platform includes a straight portion.

In a further embodiment of any of the foregoing embodiments, the second single-sided platform includes an edge portion that has a pressure side contour that is complementary in shape to the pressure side wall of the airfoil section.

In a further embodiment of any of the foregoing embodiments, forward of the edge portion, the second single-sided platform includes a straight portion.

In a further embodiment of any of the foregoing embodiments, the fiber layer in the airfoil section has a first fiber architecture and the fiber layer in at least one of the first single-sided platform or the second single-sided platform has a second fiber architecture that is different than the first fiber architecture.

In a further embodiment of any of the foregoing embodiments, the CMC fairing is made of a CMC material that has silicon-containing ceramic fiber and a silicon-containing matrix.

A gas turbine engine according to an example of the present disclosure includes a compressor section, a combustor in fluid communication with the compressor section, and a turbine section in fluid communication with the combustor. The turbine section has vane arc segments disposed about a central axis of the gas turbine engine. Each of the vane arc segments has a ceramic matrix composite (CMC) fairing that includes an airfoil section that defines suction and pressure side walls, leading and trailing ends, and inner and outer radial ends. A first single-sided platform at the outer radial end projects in a first circumferential direction from the suction side wall, and a second single-sided platform at the inner radial end projecting in a second, opposite circumferential direction from the pressure side wall. The first single-sided platform is comprised of a fiber layer that extends from the airfoil section at the first radial end and turning into the first single-sided platform, and the second single-sided platform is comprised of the fiber layer that extends from the airfoil section at the second radial end and turning into the second single-sided platform.

A further embodiment of any of the foregoing embodiments includes inner and outer diameter supports supporting the vane arc segments by, respectively, the first single-sided platform and the second single-sided platform.

In a further embodiment of any of the foregoing embodiments, when under aerodynamic loading, the vane arc segments transfer loads to the inner and outer diameter supports via, respectively, the first single-sided platform and the second single-sided platform, and the airfoil section is in compression.

In a further embodiment of any of the foregoing embodiments, the first single-sided platform includes a first platform edge portion that has a suction side contour that is complementary in shape to the suction side wall of the airfoil section.

In a further embodiment of any of the foregoing embodiments, the second single-sided platform includes a second platform edge portion that has a pressure side contour that is complementary in shape to the pressure side wall of the airfoil section.

In a further embodiment of any of the foregoing embodiments, aft of the first platform edge portion, the first single-sided platform includes a first platform straight portion.

In a further embodiment of any of the foregoing embodiments, forward of the second platform edge portion, the second single-sided platform includes a second platform straight portion.

In a further embodiment of any of the foregoing embodiments, the fiber layer in the airfoil section has a first fiber architecture and the fiber layer in at least one of the first single-sided platform or the second single-sided platform has a second fiber architecture that is different than the first fiber architecture.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
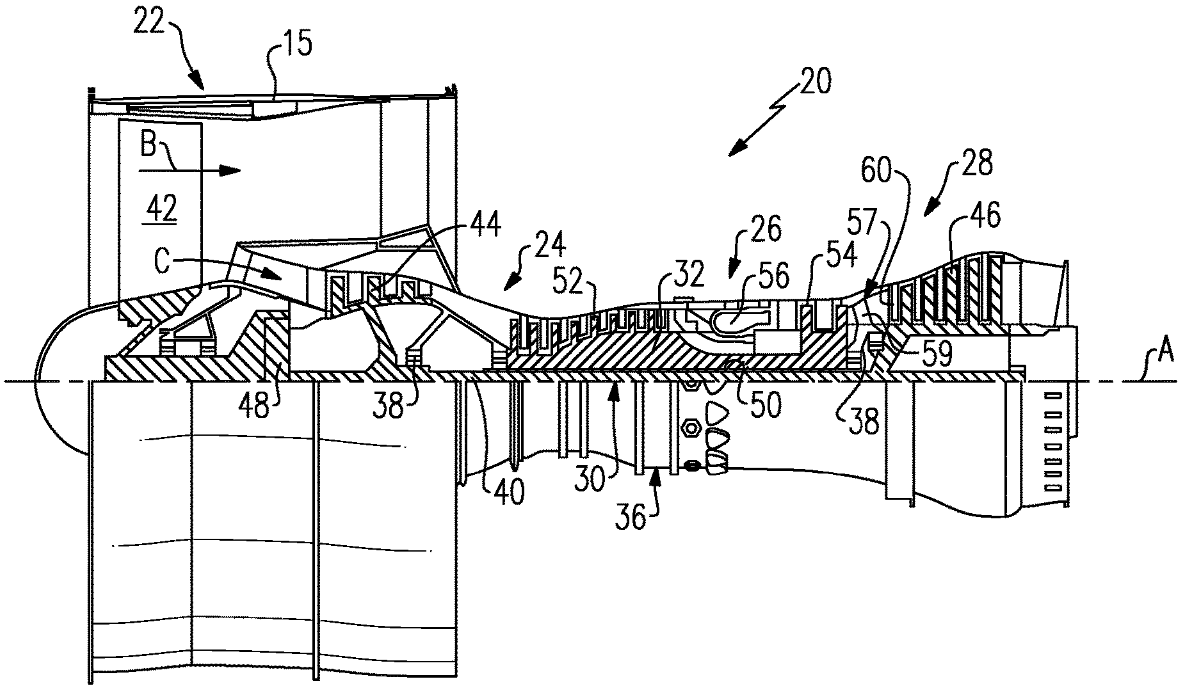
FIG. 1 illustrates as gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of [(Tram ° R)/(518.7° R)]$^{05}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Vanes in a turbine section of an engine typically include an airfoil section that extends between radially inner and outer platforms that bound the core gas path. In metallic alloy vanes, the airfoil sections are substantially centered on the platforms such that the platforms have near equal overhangs on the pressure side and the suction side of the airfoil section. The side edges of the platforms serve as matefaces and are often used as a sealing interface between vanes, such as with a flat seal in a seal slot. In a ceramic matrix composite (CMC) vane, however, such matefaces and sealing configurations may cause duress from thermal gradients and interlaminar stresses that are not present in metallic vanes. Moreover, turbine vanes require constraints to inhibit motion when loaded by gas path and/or secondary flow forces. Attachment of CMC vanes in an engine and management of stresses, however, is challenging. Attachment features, such as hooks, that are typically used for metallic alloy vanes can result in inefficient loading if employed in CMCs, which may also be sensitive to stress directionality and distress conditions that differ from those of metallic vanes. Additionally, hooks, seal slots, variable thickness walls, gussets, complex-geometry investment casting cores, etc. that may be used in metallic alloy components are generally not acceptable or manufacturable with CMC materials.

As CMC vanes may be single-piece integral structures, there is also considerable difficultly in forming the ceramic fiber layers of the CMC to the desired design shape of the vane. For example, the ceramic fiber layers are first laid up to form the airfoil section. The fabric that overhangs the radial ends of the airfoil section is then draped in opposite directions so as to fan out and form the suction and pressure sides of the platforms. There can be considerable difficulty in bending the fiber plies in opposite directions without forming discontinuities from folds, kinks, or substantial shifting of fibers. To address one or more of the above concerns, the examples set forth herein below disclose CMC vane arc segments that have single-sided platforms.

Figure 2:
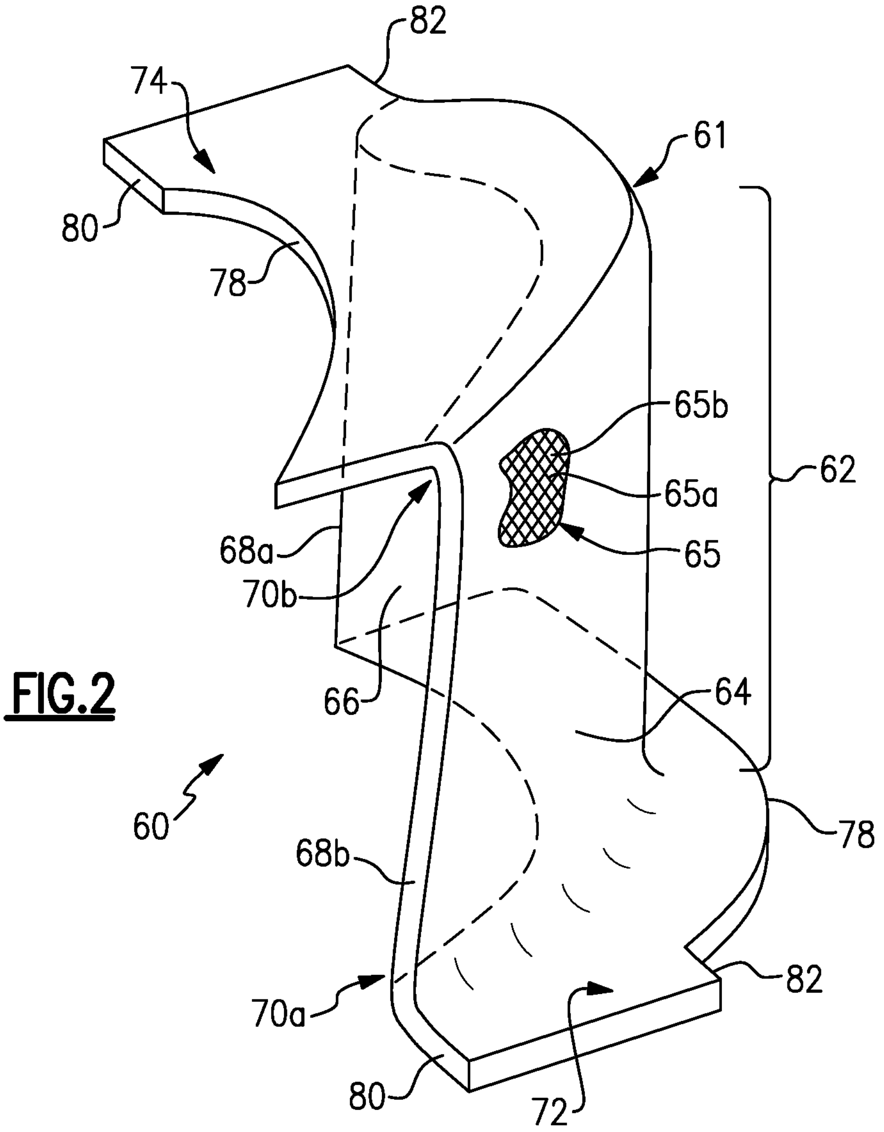
FIG. 2 illustrates a CMC vane arc segment.

FIG. 2 illustrates a vane arc segment 60 (see also FIG. 1), namely CMC fairing 61. A plurality of the vane arc segments 60 are arranged in a circumferential row about the engine central longitudinal axis A (axis A is superimposed in FIG. 2, along with radial direction RD and circumferential direction CD).

Each CMC fairing 61 includes an airfoil section 62 that defines suction and pressure side walls 64/66, leading and trailing ends 68*a*/68*b*, and outer and inner radial ends 70*a*/70*b*. The airfoil section 62 is solid but alternatively may have an internal through-cavity to convey cooling air. At the outer radial end 70*a* the airfoil section 62 has a first single-sided platform 74 projecting from the suction side wall 64 in a circumferential direction outwardly from the airfoil section 62. At the inner radial end 70*b* the airfoil section 62 has a second single-sided platform 74 that projects in the opposite circumferential direction outwardly from airfoil section 62.

The platforms 72/74 are single-sided in that they each extend to only one side—the suction side or the pressure side—of the airfoil section 62. As the first single-sided platform 72 projects from the suction side wall 64 the first single-sided platform 72 is a suction single-sided platform. Likewise, as the second single-sided platform 74 projects from the pressure side wall 66, the second single-sided platform 74 is a pressure single-sided platform. At the outer radial end 70*a* the pressure side wall 66 is absent a platform structure, at least along the profile of the airfoil section 62. Similarly, at the inner radial end 70*b* the side wall 64 is absent a platform structure, at least along the profile of the airfoil section 62.

Terms such as "inner" and "outer" refer to location with respect to the central engine axis A, i.e., radially inner or radially outer. Moreover, the terminology "first" and "second" as used herein is to differentiate that there are two architecturally distinct structures. It is to be further understood that the terms "first" and "second" are interchangeable in the embodiments herein in that a first component or feature could alternatively be termed as the second component or feature, and vice versa.

The CMC fairings 61 are made of CMC material, shown in partial cutaway at 65. CMC material 65 is comprised of one or more ceramic fiber layers 65*a* in a ceramic matrix 65*b*. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber layers are disposed within a SiC matrix. A fiber layer has a fiber architecture, which refers to an ordered arrangement of the fiber tows relative to one another, such as a 2D woven ply or a 3D structure. The CMC fairings 61 are one-piece structures in that the fiber layer or layers are continuous from the platform 72, through the airfoil section 62, and into the platform 74.

Each of the platforms 72/74 includes an edge portion 78 that has a contour that is complementary in shape to the airfoil section 62. The edge portion 78 of the platform 72 has a contour that is complementary in shape to the pressure side wall 66 of the airfoil section 62, i.e., the edge portion 78 fits intimately with the pressure side wall 66. The edge portion 78 of the platform 74 has a contour that is complementary in shape to the suction side wall 64 of the airfoil section 62, i.e., the edge portion 78 fits intimately with the suction side wall 74. Each platform 72/74 also has a straight portion 80. On the platform 72 the straight portion 80 is aft of the edge portion 78, and on the platform 74 the straight portion 80 is forward of the edge portion 78.

When adjacent CMC fairings 61 in the circumferential vane row are brought together, the fairings 61 nest with each other such that the contour on the platform 72 bears against the pressure side wall 66 of the next adjacent fairing 61 in the row, and the contour of the platform 74 bears against the suction side wall 64 of the next adjacent fairing 61 in the other direction in the vane row. Similarly, the straight portions 80 bear against corresponding straight portions 82 of those next fairings 61 in the vane row. The straight portions 80/82 form a platform-to-platform split line fore and aft of the airfoil sections 62.

Figure 3:
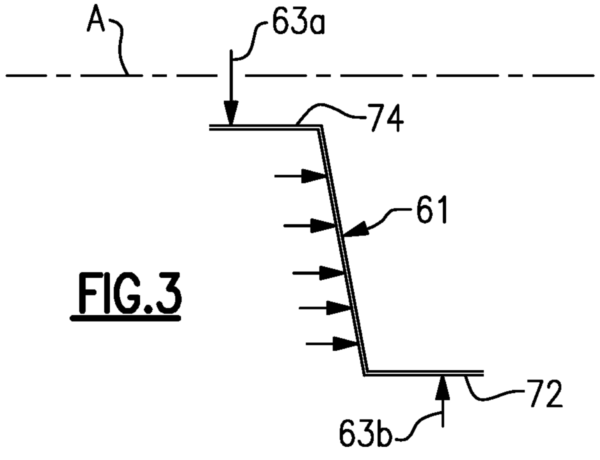
FIG. 3 illustrates a line representation of a vane arc segment and supports.

Referring also to FIG. 3, which shows a line representation of one of the CMC fairings 61, the CMC fairings 61 are supported between inner and outer static supports 63*a*/63*b* (FIG. 3). Each of the static supports 61*a*/61*b* may independently be, but are not limited to, an engine case, a full hoop ring, a ring arc segment, a tangential onboard injector (TOBI) structure, or an intermediate structure that is attached to any of these. Each CMC fairing 61 is self-supporting and reacts out its own aerodynamic loads via contact points or regions on the single-sided platforms 72/74 where the loads are transmitted into the static supports 63*a*/63*b*.

As the platforms 72/74 are on opposite sides of the airfoil section 62, the line of action between the points or region where the loads are transmitted crosses the airfoil section 62 and represents a cross-corner loading state. A wheelbase, i.e., the distance between the cross-corner points or regions on the platforms 72/74 where the loads are transmitted to the static structures 63*a*/63*b*, determines the load-carrying capacity of the CMC fairings 61. In general, increasing the wheelbase (length) corresponds to an increase in load-carrying capacity.

Additionally, as the platforms 72/74 extend in opposite circumferential directions, the cross-corner points or regions on the platforms 72/74 are axially and circumferentially offset from each other. Thus, under aerodynamic loading where the net load acts in a direction from the pressure side wall to the suction side wall, the fairings 61 will tend to rotate but for the constraints by the supports 63*a*/63*b*. The resultant transmission of the loads through the fairings 61 places the airfoil section 62 in compression. CMC materials are generally strong in compression loading and weaker in tension loading, which can cause interlaminar stresses. Therefore, compression loading is a favorable loading state for a CMC article such as the CMC fairings 61.

Figure 4:
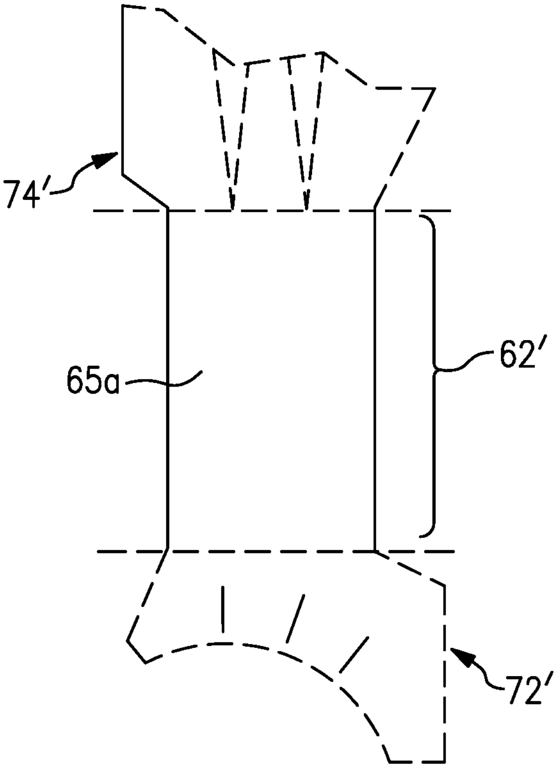
FIG. 4 illustrates a fiber layer prior to folding the ends to form platforms.
Figure 5:
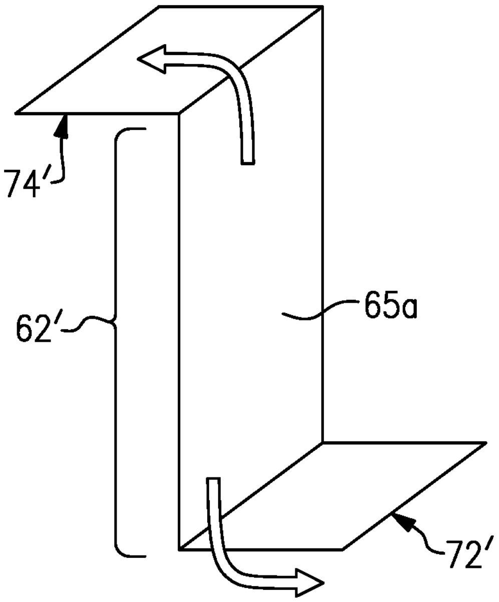
FIG. 5 illustrates folding of the ends of the fiber layer to form the platforms.

FIGS. 4 and 5 depict the fiber layer 65*a* during fabrication of the CMC fairing 61. For example, the fiber layer 65*a* is formed in a braiding or weaving process. The central portion 62' of the fiber layer 65*a* corresponds to the airfoil section 62, while the end portions 72'/74' correspond to the platforms 72/74. As depicted in FIG. 5, the end portions 72'/74' are folded over at the ends of the central portion 62' to form the walls that will be the platforms 72/74. Thus, the fiber layer 65*a* extends from the airfoil section 62 and turns at either end into the platforms 72/74. In a further example, the fiber layer 65*a* may have different fiber architecture in the central portion 62' than the fiber architecture of the end portions 72'/74'. For instance, the fiber architecture in the central portion 62' is selected for high strength and rigidity, while the fiber architecture in the end portions 72'/74' is selected to permit facile folding. As an example, the fiber architecture in the central portion 62' has a high fiber volume, while the fiber architecture in the end portions 72'/74' has a lower fiber volume, which provides interstitial space between the fibers that allows the fibers to shift so that the end portions 72'/74' more easily bend.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:

a ceramic matrix composite (CMC) fairing including an airfoil section defining suction and pressure side walls, leading and trailing ends, and inner and outer radial ends, a first single-sided platform at the outer radial end projecting in a first circumferential direction from the suction side wall, and a second single-sided platform at the inner radial end projecting in a second, opposite circumferential direction from the pressure side wall, wherein the first single-sided platform being comprised of a fiber layer extending from the airfoil section at the first radial end and turning into the first single-sided platform, and the second single-sided platform being comprised of the fiber layer extending from the airfoil section at the second radial end and turning into the second single-sided platform, the first single-sided platform includes an edge portion that has a contour that is complementary in shape to the pressure side wall of the airfoil section, and aft of the edge portion the first single-sided platform includes a straight portion, the straight portion comprising circumferentially-facing surfaces on both suction and pressure side wall facing sides of the straight portion, aft of the airfoil section.

2. The vane arc segment as recited in claim 1, wherein the first single-sided platform includes an edge portion that has a contour that is complementary in shape to the pressure side wall of the airfoil section.

3. The vane arc segment as recited in claim 2, wherein, aft of the edge portion, the first single-sided platform includes a straight portion.

4. The vane arc segment as recited in claim 1, the fiber layer in the airfoil section having a first fiber architecture and the fiber layer in at least one of the first single-sided platform or the second single-sided platform has a second fiber architecture that is different than the first fiber architecture with respect to ordered arrangements of fiber tows in the first fiber architecture and the second fiber architecture.

5. The vane arc segment as recited in claim 4, wherein the first fiber architecture has a first volume of fibers and the second fiber architecture has a second volume of fibers that is less than the first volume of fibers.

6. The vane arc segment as recited in claim 1, the second single-sided platform includes an edge portion that has a contour that is complementary in shape to the suction side wall of the airfoil section, and forward of the edge portion of the second single-sided platform, the second single-sided platform includes a straight portion, the straight portion comprising circumferentially-facing surfaces on both suction and pressure side wall facing sides of the straight portion, forward of the airfoil section.

7. The vane arc segment as recited in claim 1, wherein the second single-sided platform includes an edge portion that has a contour that is complementary in shape to the suction side wall of the airfoil section.

8. The vane arc segment as recited in claim 7, wherein, forward of the edge portion, the second single-sided platform includes a straight portion.

9. The vane arc segment as recited in claim 1, wherein the CMC fairing is made of a CMC material that has silicon-containing ceramic fiber and a silicon-containing matrix.

10. A gas turbine engine comprising:

a compressor section;

a combustor in fluid communication with the compressor section; and a turbine section in fluid communication with the combustor, the turbine section having vane arc segments disposed about a central axis of the gas turbine engine, each of the vane arc segments includes a ceramic matrix composite (CMC) fairing including an airfoil section defining suction and pressure side walls, leading and trailing ends, and inner and outer radial ends, a first single-sided platform at the outer radial end projecting in a first circumferential direction from the suction side wall, and a second single-sided platform at the inner radial end projecting in a second, opposite circumferential direction from the pressure side wall, wherein the first single-sided platform being comprised of a fiber layer extending from the airfoil section at the first radial end and turning into the first single-sided platform, and the second single-sided platform being comprised of the fiber layer extending from the airfoil section at the second radial end and turning into the second single-sided platform, the first single-sided platform includes an edge portion that has a contour that is complementary in shape to the pressure side wall of the airfoil section, and aft of the edge portion the first single-sided platform includes a straight portion, the straight portion comprising circumferentially-facing surfaces on both suction and pressure side wall facing sides of the straight portion, aft of the airfoil section.

11. The gas turbine engine as recited in claim 10, further comprising inner and outer diameter supports supporting the vane arc segments by, respectively, the first single-sided platform and the second single-sided platform.

12. The gas turbine engine as recited in claim 10, wherein, when under aerodynamic loading, the vane arc segments transfer loads to the inner and outer diameter supports via, respectively, the first single-sided platform and the second single-sided platform, and the airfoil section is in compression.

13. The gas turbine engine as recited in claim 10, the fiber layer in the airfoil section having a first fiber architecture and the fiber layer in at least one of the first single-sided platform or the second single-sided platform has a second fiber architecture that is different than the first fiber architecture with respect to ordered arrangements of fiber tows in the first fiber architecture and the second fiber architecture.

14. The gas turbine engine as recited in claim 10, the second single-sided platform includes an edge portion that has a contour that is complementary in shape to the suction side wall of the airfoil section, and forward of the edge portion of the second single-sided platform, the second single-sided platform includes a straight portion, the straight portion comprising circumferentially-facing surfaces on both suction and pressure side wall facing sides of the straight portion, forward of the airfoil section.

15. The gas turbine engine as recited in claim 10, wherein the first single-sided platform includes a first platform edge portion that has a contour that is complementary in shape to the pressure side wall of the airfoil section.

16. The gas turbine engine as recited in claim 15, wherein the second single-sided platform includes a second platform edge portion that has a contour that is complementary in shape to the suction side wall of the airfoil section.

17. The gas turbine engine as recited in claim 16, wherein, aft of the first platform edge portion, the first single-sided platform includes a first platform straight portion.

18. The gas turbine engine as recited in claim 17, wherein, forward of the second platform edge portion, the second single-sided platform includes a second platform straight portion.

19. A vane arc segment comprising:

a ceramic matrix composite (CMC) fairing including an airfoil section defining suction and pressure side walls, leading and trailing ends, and inner and outer radial ends, a first single-sided platform at the outer radial end projecting in a first circumferential direction from the suction side wall, and a second single-sided platform at the inner radial end projecting in a second, opposite circumferential direction from the pressure side wall, wherein the first single-sided platform being comprised of a fiber layer extending from the airfoil section at the first radial end and turning into the first single-sided platform, the second single-sided platform being comprised of the fiber layer extending from the airfoil section at the second radial end and turning into the second single-sided platform, and the second single-sided platform includes an edge portion that has a contour that is complementary in shape to the suction side wall of the airfoil section, and forward of the edge portion of the second single-sided platform, the second single-sided platform includes a straight portion, the straight portion comprising circumferentially-facing surfaces on both suction and pressure side wall facing sides of the straight portion, forward of the airfoil section.

* * * * *